3,235,555
7-AMINO-3-CYANOETHYL-1-METHYL-2,4-DIOXO-
1,2,3,4,5,6 - HEXAHYDROPYRIDO[2,3-d]PYRIMI-
DINE AND RELATED COMPOUNDS
Viktor Papesch, Morton Grove, Ill., assignor to G. D.
Searle & Co., Chicago, Ill., a corporation of Delaware
No Drawing. Filed Nov. 12, 1963, Ser. No. 323,071
5 Claims. (Cl. 260—256.4)

The present invention relates to a group of bicyclic heterocyclic compounds which contain an amino group and a cyanoethyl group as substituents. More particularly, it relates to compounds of the following general formula

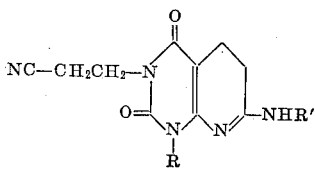

wherein R is lower alkyl, lower alkenyl, phenyl, or benzyl; and R' is hydrogen or lower alkanoyl.

The lower alkyl radicals referred to above contain up to 6 carbon atoms and are exemplified by radicals such as methyl, ethyl, propyl, butyl, pentyl, and hexyl. The lower alkenyl radicals referred to above likewise contain up to 6 carbon atoms and are exemplified by radicals such as allyl and methallyl. In addition, the lower alkanoyl radicals referred to above contain up to 6 carbon atoms and can be exemplified by acetyl and propionyl.

The compounds of this invention possess valuable pharmacological properties. In particular, the present compounds are anti-ulcer agents and this activity can be demonstrated by their inhibition of ulceration in the Shay rat. They also possess anti-inflammatory activity which is demonstrated by a phenylbutazone-like effect on edematous conditions.

The compounds of the present invention are conveniently prepared from 1-substituted 6-amino-uracils and acrylonitrile. The reaction is conveniently carried out in a solution consisting of water and an organic base. The base involved should be water soluble. Amines such as pyridine are favored for this purpose. It is further preferred to carry out the reaction in the presence of a quaternary ammonium hydroxide which will catalyze the cyanoethylation reaction involved. Trimethylbenzylammonium hydroxide is a useful base for this purpose, and it further promotes the ring closure described below.

The reaction is generally carried out in the presence of a considerable excess of acrylonitrile to insure reaction at both the 3- and the 5-positions of the uracil. The reaction apparently proceeds by way of a 6-amino-5-cyanoethyluracil which then cyclizes to give the bicyclic compounds of the present invention. Evidence for this is the fact that 6-amino-5-cyanoethyl-uracils can be isolated from the type of reaction described above and it has been found that this type of compound cyclizes readily to give the present type of compound. Therefore, 1-substituted 6-amino-3,5-bis(2-cyanoethyl)uracils must be considered useful intermediates for the preparation of the compounds of the present invention. Obviously, monocyanoethyl-6-aminouracils are still earlier intermediates in the reaction.

The compounds which constitute this invention and their preparation will appear more fully from a consideration of the following examples which are given for the the purpose of illustration only and are not to be construed as limiting the invention in spirit or in scope. In these examples, quantities are indicated by parts by weight unless parts by volume are specified, and temperatures are indicated in degrees centigrade (° C.) The relationship between parts by weight and parts by volume is the same as that existing between grams and milliliters.

*Example 1*

A mixture of 20 parts of 6-amino-1-methyluracil, 1500 parts by volume of a 50% by volume pyridine-water mixture, 32 parts of acrylonitrile, and 10 parts by volume of a 40% aqueous solution of trimethylbenzyl-ammonium hydroxide is refluxed for 3.5 hours. The resultant mixture is heated on a steam bath under reduced pressure to remove low boiling materials. The residue is mixed with 100 parts of water and filtered, and the filtered solid is further washed with water. The resultant solid is then boiled with 1400 parts of water and filtered and the resultant filtrate is cooled. The solid which crystallizes is separated by filtration. It is 7-amino-1-methyl-3 - (2 - cyanoethyl) - 2,4 - dioxo - 1,2,3,4,5,6 - hexahydropyrido[2,3-d]pyrimidine and it melts at about 271–273° C. after recrystallization from water. This compound has the following formula

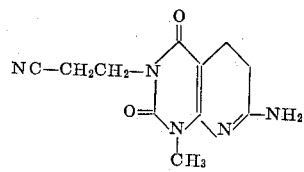

*Example 2*

A mixture of 50 parts of 6-amino-1-ethyluracil, 600 parts by volume of a 50% by volume pyridine-water mixture, 80 parts of acrylonitrile, and 25 parts by volume of a 40% aqueous solution of trimethylbenzylammonium hydroxide is refluxed for 3 hours. The reaction mixture is then cooled and filtered to remove a small amount of insoluble material. The resultant filtrate is then evaporated to dryness under reduced pressure on a steam bath. To the resultant residue is added 200 parts of warm water and the resultant suspension is filtered. The solid thus separated is recrystallized from water several times to give 7-amino-1-ethyl-3-(2-cyanoethyl)-2,4-dioxo-1,2,3, 4,5,6-hexahydropyrido[2,3-d]pyrimidine melting at about 238° C.

To obtain the corresponding 6-amino-3,5-bis(2-cyanoethyl)uracil, the following procedure can be used. A mixture of 100 parts of 6-amino-1-ethyluracil, 1200 parts by volume of a 50% by volume pyridine-water mixture, and 80 parts of acrylonitrile is refluxed for 3 hours. An additional 80 parts of acrylonitrile is added and refluxing is resumed for an additional 2 hours. This process is repeated twice. The final mixture is then heated on a steam bath under reduced pressure to remove low boiling materials. A thick pasty residue remains and this is stirred with 120 parts of water and 5 parts of acetic acid and then filtered. The solvent is evaporated from the filtrate to leave a glassy solid. A portion of this solid (25 parts) is stirred with 225 parts of ethyl acetate and filtered and the resultant filtrate is diluted with 225 parts of benzene and filtered again. The resultant ethyl acetate-benzene solution is chromatographed on a silica gel column. The column is then eluted with increasing quantities of ethyl acetate in benzene and the solvent is evaporated from the fractions eluted with 80% ethyl acetate in benzene. The residual solid is recrystallized from methanol to give 6-amino-1-ethyl-3,5-bis(2-cyanoethyl)uracil melting at about 170–171° C. This particular compound has the following formula

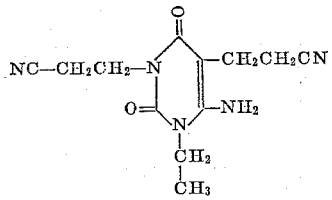

*Example 3*

A mixture of 30 parts of 6-amino-1-propyluracil, 150 parts by volume of a 50% by volume pyridine-water mixture, 50 parts of acrylonitrile, and 15 parts of a 40% aqueous solution of trimethylbenzylammonium hydroxide is refluxed for 3.5 hours. Low boiling materials are removed by distillation at reduced pressure on a steam bath. The residual syrup is treated with 160 parts of acetone and cooled and filtered. The precipitate thus separated is recrystallized from water to give a product melting at about 205–206° C. This compound is 7-amino - 1 - propyl - 3 - (2 - cyanoethyl) - 2,4 - dioxo-1,2,3,4,5,6-hexahydropyrido[2,3-d]pyrimidine.

To obtain the corresponding 6-amino-3,5-bis(2-cyanoethyl)uracil, the following procedure can be used. To a solution of 80 parts of 6-amino-1-propyluracil and 400 parts by volume of a 50% by volume pyridine-water solution, there is added 65 parts of acrylonitrile and the resultant solution is refluxed for 3 hours. An additional 65 parts of acrylonitrile is added and refluxing is resumed for an additional 2 hours. The resultant mixture is heated on a steam bath under reduced pressure to remove the low boiling materials. 50 parts of water is added to the residue and this is again evaporated to dryness. Then, 200 parts of hot methanol is added and mixed with the solid and the resultant suspension is filtered while hot. The filtrate is cooled and filtered and the solvent is evaporated from this new filtrate. The residue is dissolved in ethyl acetate, chromatographed on a silica gel column, and eluted with increasing quantitiess of methanol in ethyl acetate. The fraction eluted with 2% methanol in ethyl acetate is evaporated to dryness and then dissolved in 50% ethyl acetate in benzene and again chromatographed on a silica gel column. The column is eluted with increasing quantities of ethyl acetate in benzene. The fraction eluted with 60% ethyl acetate in benzene is evaporated to dryness and the residue is recrystallized from water and dried to give 6-amino-1-propyl-3,5-bis(2-cyanoethyl)uracil which softens at about 120° C. and then melts completely at about 145° C.

*Example 4*

To a solution of 116 parts of 6-amino-1-allyluracil and 1300 parts by volume of 50% by volume pyridine-water solution, there is added 185 parts of acrylonitrile and the resultant solution is refluxed for 2 hours. Then, 95 parts of additional acrylonitrile is added and reflux is continued for an additional 2 hours. This procedure is repeated twice and the reflux period is extended to 3 hours after the last addition. The mixture is then heated on a steam bath under reduced pressure to distill off low boiling materials. The residual solid is diluted with 500 parts of boiling water and filtered hot. The solvent is evaporated from the above filtrate to leave a glassy residue. This residue is boiled with 1100 parts of ethyl acetate and filtered and the filtrate is diluted with 1050 parts of benzene and filtered. The filtrate is absorbed on a silica gel column and eluted with increasing quantities of ethyl acetate in benzene. The later fractions from the eluate from 50% ethyl acetate in benzene are separated, the solvent is evaporated, and the residue is recrystallized from 10% methanol in ethyl acetate to give 6-amino-1-allyl-3,5-bis(2-cyanoethyl)uracil melting at about 151° C.

Elution of the above chromatographic column with 60–65% ethyl acetate in benzene gives a solution which, after evaporation of the solvent, leaves a crystalline residue. This is recrystallized from 15% methanol in ethyl acetate to give 7-amino-1-allyl-3-(2-cyanoethyl)-2,4 - dioxo-1,2,3,4,5,6-hexahydropyrido-[2,3-d]pyrimidine melting at about 179–181° C.

What is claimed is:

1. A compound of the formula

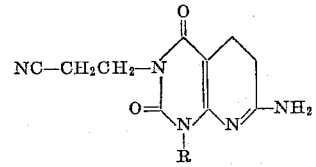

wherein R is selected from the group consisting of lower alkyl and lower alkenyl.

2. A compound of the formula

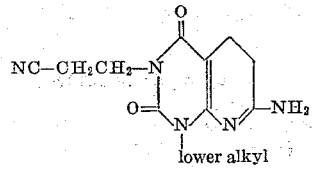

3. 7 - amino - 1 - ethyl - 3 - (2-cyanoethyl)-2,4-dioxo-1,2,3,4,5,6-hexahydropyrido[2,3-d]pyrimidine.

4. 7 - amino - 1 - methyl - 3-(2-cyanoethyl)-2,4-dioxo-1,2,3,4,5,6-hexahydropyrido[2,3-d)pyrimidine.

5. 7 - amino - 1 - allyl - 3-(2-cyanoethyl)-2,4-dioxo-1,2,3,4,5,6-hexahydropyrido[2,3-d]pyrimidine.

No references cited.

NICHOLAS S. RIZZO, *Primary Examiner.*